United States Patent [19]

Mazur et al.

[11] 4,334,711
[45] Jun. 15, 1982

[54] SYSTEM FOR AUTOMATICALLY DELAYING APPLICATION OF A SNOW BRAKE FOR A RAILWAY VEHICLE

[75] Inventors: Richard J. Mazur, Pittsburgh; Robert D. Dimsa, Irwin; John T. Pekarcik, Murrysville, all of Pa.

[73] Assignee: American Standard Inc., Wilmerding, Pa.

[21] Appl. No.: 201,094

[22] Filed: Oct. 27, 1980

[51] Int. Cl.³ .............................................. B60T 7/12
[52] U.S. Cl. ....................................... 303/16; 188/198
[58] Field of Search .................................. 303/14–16, 303/20, 44, 71, 72; 188/153 R, 198, 202

[56] References Cited

U.S. PATENT DOCUMENTS

| | | | |
|---|---|---|---|
| 3,517,784 | 6/1970 | Clemmons | 188/198 X |
| 3,823,984 | 7/1974 | Parfitt et al. | 303/15 X |

Primary Examiner—Duane A. Reger
Attorney, Agent, or Firm—G. J. Falce

[57] ABSTRACT

A "snow brake" control system for a railway vehicle in which an electronic timing circuit is operative in response to the operator's brake valve device being moved to its brake release position to provide an output signal that acts through a relay switch to deenergize a magnet valve that normally interrupts communication of "snow brake" control pressure to the system relay valve in order to withhold "snow brake" operation for a predetermined period of time sufficient to allow the vehicle brake units to release the brakes and thereby effect operation of the brake unit slack adjuster mechanism. When the time period expires, the timing circuit output signal disappears and the magnet valve becomes energized to reestablish "snow brake" control pressure during the remainder of the brake release period to maintain a light brake application in effect.

5 Claims, 1 Drawing Figure

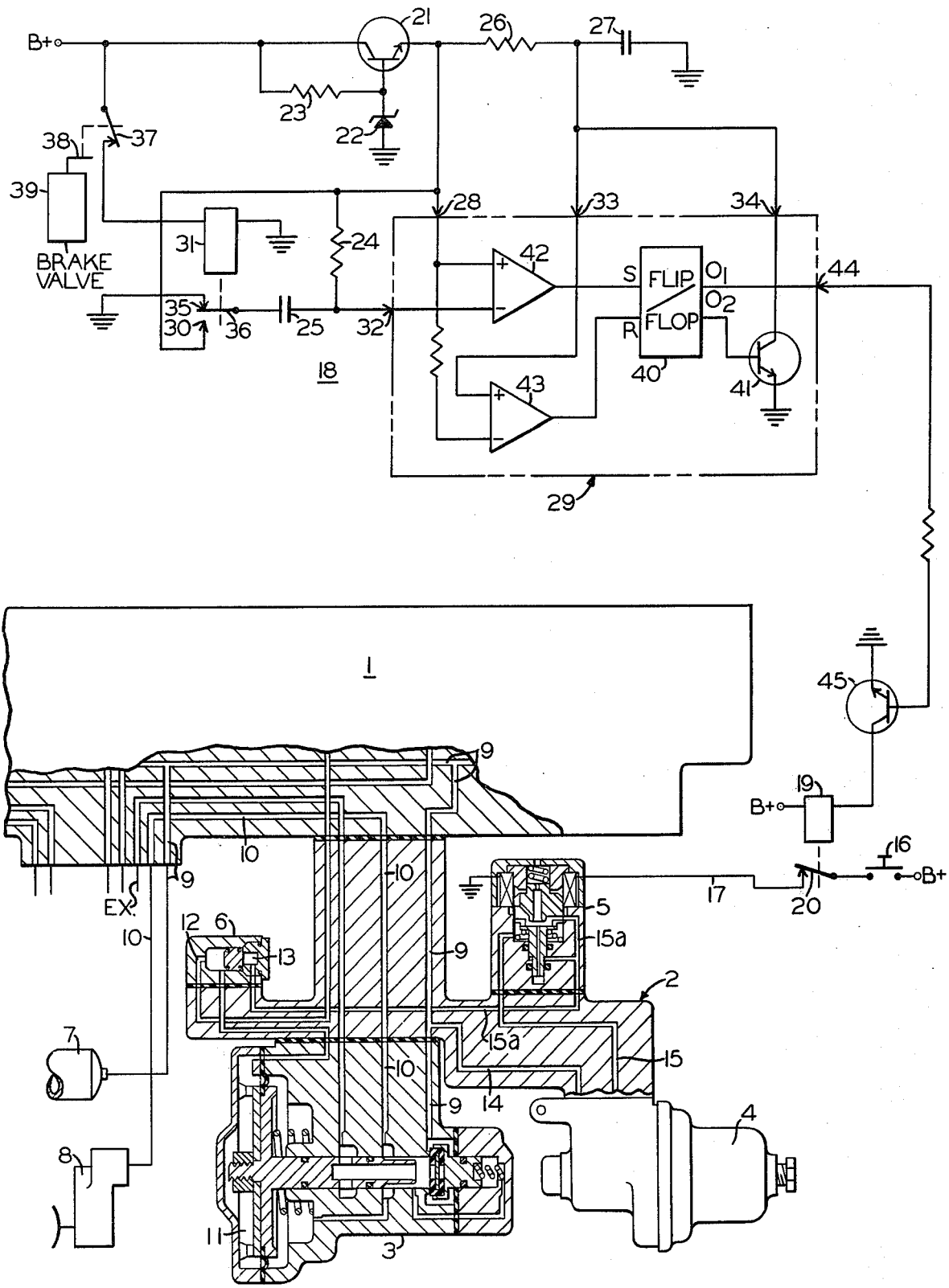

4,334,711

SYSTEM FOR AUTOMATICALLY DELAYING APPLICATION OF A SNOW BRAKE FOR A RAILWAY VEHICLE

BACKGROUND OF THE INVENTION

The present invention is related to brake apparatus having a "snow brake" function and particularly to such apparatus when associated with brake units having automatic slack adjusters.

Railroad vehicles operating in transit service typically employ brake units similar to the type shown and disclosed in U.S. Pat. No. 3,707,208, in which an automatic, single-acting slack adjuster is employed to compensate for brake shoe/wheel tread wear. Operation of this slack adjuster mechanism is predicated upon movement of the brake apparatus to brake release position.

During winter conditions, the above-mentioned "snow brake" feature, may be selectively activated by the train operator or attendant to automatically provide a light brake application in effect during normal periods of brake release. In this way, friction generated by the brake shoe/wheel engagement produces sufficient heat to prevent any accumulation of ice between the brake shoe and wheel tread without any significant braking action being realized.

In maintaining a light brake application in effect, however, the "snow brake" feature precludes movement of the brake apparatus to brake release position and accordingly renders the slack adjuster mechanism inoperative. It is therefore a requirement of the operator or train attendant to periodically (generally at the beginning of each day) deactivate the "snow brake" and effect several cycles of brake application and release to allow operation of the slack adjuster mechanism to take up slack previously accumulated during activation of the "snow brake".

SUMMARY OF THE INVENTION

The object of the present invention, therefore, is to automatically withhold operation of the "snow brake" function, for a predetermined time period, during release of each brake application, sufficient to permit slack adjuster operation, thus assuring continuous take-up of slack due to brake shoe/wheel wear.

This objective is accomplished by providing an electric timing circuit having an output that controls a cut-out switch in the supply circuit to the "snow brake" control magnet valve. As long as the cut-out switch is closed, while the "snow brake" is activated, a regulated supply of fluid pressure is connected to the control chamber of a relay valve device in parallel with the normal brake control pressure via a double check valve. The relay valve, in turn, provides brake pressure proportional to the effective control pressure, so that in the absence of normal brake pressure, a "snow brake" application corresponding to the regulated pressure supply remains effective to hold the brake shoes in light contact with the wheel tread.

The timing circuit is activated, when a brake application is released, to provide an output for a predetermined period of time, during which the cut-out switch in the "snow brake" control magnet valve supply circuit is opened to cause the magnet valve to interrupt the regulated supply of fluid pressure to the relay valve device. Accordingly, the "snow brake" is withheld for a period of time sufficient to allow complete release of the brake apparatus and consequently operation of the slack adjuster mechanism. When the time period has expired, the timing circuit automatically resets and the output signal disappears to allow the cut-out switch to close and again establish "snow brake" pressure.

BRIEF DESCRIPTION OF THE DRAWING

This and other objects and attendant advantages will be apparent from the following detailed description and operation, when taken with the accompanying single FIGURE drawing showing an electric timing circuit arranged to control the "snow brake" portion of a pneumatic brake control valve device, shown diagrammatically.

DESCRIPTION AND OPERATION

Shown attached to a conventional type control valve device 1 is the usual "snow brake" portion 2 comprising a self-lapping relay valve device 3, a pressure regulator 4, a two-way magnet valve device 5, and a double check valve device 6. As is well known in the art, relay valve device 3 delivers brake pressure from a supply reservoir 7 to the vehicle brake units 8 during brake application, via a supply line 9 and a delivery line 10, in proportion to the control pressure effective in the relay valve control chamber 11, and releases this pressure during brake release. This control pressure is provided by way of double check valve device 6, in accordance with the preponderant pressure effective at the opposing inlets 12 and 13 of the double check valve device. Inlet 12 is subject to the fluid pressure developed by the control valve device 1 in a well-known manner, while inlet 13 is subject to the fluid pressure developed by pressure regulator 4, hereinafter referred to as "snow brake" control pressure. Pressure in supply reservoir 7 is connected from supply line 9 to a branch line 14 leading to the supply port of pressure regulator 4, which is adjustable and operative in a well-known manner to provide and maintain "snow brake" control pressure at inlet 13 via a delivery line 15 and the magnet valve device 5, when the magnet valve device 5 is in its energized state. Energization of the magnet valve solenoid operator is controlled by a manual switch 16, which may be conveniently located in the railway vehicle cab for operation by the operator or train attendant, when the "snow brake" function is desired. Closure of switch 16 connects a source of electric power B+ to the magnet valve solenoid via a control wire 17.

When magnet valve device 5 is energized by closure of switch 16, pressure from supply reservoir 7 is adjusted and delivered to inlet 13 of double check valve device 6 via delivery line 15 and magnet valve device 5, in accordance with the setting of pressure regulator 4. During periods of brake release, pressure at inlet 12 of double check valve device 6 is released, in accordance with operation of control valve device 1. Consequently, the preponderant "snow brake" control pressure at inlet 13 is connected to control chamber 11 of relay valve device 3, which operates in a well-known manner to connect pressure from supply reservoir 7 to brake units 8 via lines 9 and 10, in accordance with a low setting of regulator 4. This establishes a "snow brake" force sufficient to maintain light brake shoe engagement during periods of brake release, for the purpose of preventing the accumulation of ice between the brake shoes and wheel tread.

In accordance with the present invention, there is provided a timing circuit 18, the output of which is connected to a relay 19 having a contact 20 in control wire 17, in series with manual switch 16. The purpose of this timing circuit is to interrupt energization of magnet valve device 5, for a predetermined time period following release of a brake application, during which time "snow brake" control pressure is withheld from brake units 8, in order to assure operation of the slack adjuster mechanism thereof, by movement of the brake units to release position.

A source of electric power B+ is regulated by a conventional series-pass voltage regulator circuit comprising a transistor 21 having a Zener diode 22 at its base terminal and a shunt resistor 23 between the collector and base terminals. Regulated voltage is connected from the emitter terminal of transistor 21 to a first r-c network comprising a resistor 24 and a capacitor 25, to a second r-c network comprising a resistor 26 and a capacitor 27, to a supply terminal 28 of a control circuit 29, and to the back contact 30 of a relay 31. Control circuit 29 is commercially available in the form of an integrated circuit and is shown and explained on pages 8.298-8.301 of Motorola Inc. book, entitled "SemiConductor Data Library". The juncture between resistor 24 and capacitor 25 is connected to the trigger terminal 32 of integrated control circuit 29, while the juncture between resistor 26 and capacitor 27 is connected to the threshold terminal 33 and discharge terminal 34 of integrated control circuit 29. Relay 31 also includes a grounded front contact 35 and a switch member 36 that is connected to the terminal of capacitor 25 opposite the terminal connected to resistor 24. A switch 37 operated by handle 38 of an operator's brake valve device 39 is connected to a source of electric power B+ to control energization of relay 31. Switch member 37 is held open until handle 38 is moved to its brake release position.

Assuming a brake application is made, handle 38 of brake valve device 39 is moved out of release position into the brake application zone, thereby causing switch 37 to open and accordingly disconnect power from relay 31. Contact 36 of relay 31 thus drops out of engagement with contact 35 and into engagement with contact 30 to effectively discharge capacitor 25, by reason of the regulated supply voltage being connected to both terminals of the capacitor. This regulated supply voltage is thus established at trigger terminal 32 of control circuit 29. Concurrently, capacitor 27 is also discharged by reason of the reset output $O_2$ of a flip-flop 40 being in a logical "1" digital state. High voltage is thus connected to the base terminal of a transistor 41, which is accordingly "turned on". Since the emitter terminal of transistor 41 is grounded, both terminals of capacitor 27 are at ground potential when transistor 41 is "turned on", thus effectively discharging capacitor 27. Therefore, no voltage is present at threshold terminal 33 of control circuit 29. A pair of comparitors 42 and 43 have their respective outputs connected to the set input S and to the reset input R of flip-flop 40 to control the state of the flip-flop outputs $O_1$ and $O_2$. The positive input of comparator 42 and the negative input of comparator 43 are connected to supply terminal 28 and are thus subject to the regulated supply voltage, while the negative input of comparator 42 is connected to trigger terminal 32, and the positive input of comparator 43 is connected to threshold terminal 33. Thus, both inputs of comparator 42 are at the supply voltage potential and the comparator output is at a logical "0" level. The digital output state of comparator 42 goes to a logical "1" level only when the voltage at trigger terminal 32 is below a predetermined percentage of the regulated voltage at supply terminal 28, such as for example 33.3%. Since capacitor 27 is discharged by reason of both its terminals being at ground potential, threshold terminal 33 and the positive input of comparator 43 are also at ground potential, thereby causing the output of comparator 43 to assume a logical "0" level. The digital output state of comparator 43 goes to a logical "1" level only when the voltage at threshold terminal 33 exceeds a predetermined percentage of the voltage at supply terminal 28, such as for example 66.6%. In the absence of any voltage at terminal 33, and the presence of high voltage at trigger terminal 32, therefore, both flip-flop inputs S and R are absent, so that the flip-flop is stable in its reset state. Accordingly, output $O_1$ is at a logical "0" level. Flip-flop output $O_1$ is connected to the output terminal 44 of control circuit 29, to which terminal the base terminal of a control transistor 45 is connected. Transistor 45 is in the control circuit of relay 19, which in turn controls switch 20 in the control circuit of the "snow brake" magnet valve device 5.

When output $O_1$ of flip-flop 40 is at a logical "0" level, as above explained, transistor 45 is "turned off", thus interrupting the supply of power B+ to relay 19, which is accordingly deenergized. This effects closure of switch 20 to connect power B+ to magnet valve 5, provided manual switch 16 in control wire 17 is closed by the operator to establish "snow brake" operation.

Since a brake application has been made, however, as hereinbefore assumed, double check valve device 6 is moved to the position in which it is shown, by the predominant brake control pressure at input 12, thus cutting off the lower "snow brake" control pressure connected to input 13 of double check valve 6 via pressure regulator 4, the energized magnet valve device 5, and delivery line 15.

When it is desired to release the brake application, handle 38 of brake valve device 39 is moved from the brake application zone to release position, in which switch 37 is closed to connect power to relay 31. In its energized condition, relay 31 picks up its switch 36 for engagement with contact 35, thus connecting capacitor 25 to ground. Since the voltage across a capacitor cannot change instantaneously, the voltage at the opposite terminal of capacitor 25, and thus at trigger terminal 32 of control circuit 29, goes to a low voltage level as the capacitor begins to charge at an exponential rate, as determined by the r-c time constant of resistor 24 and capacitor 25. The resultant voltage differential across the inputs of comparator 42 causes the comparator output to go to a logical "1" level, thereby setting output $O_1$ of flip-flop 40 to a logical "1" level and output $O_2$ of flip-flop 40 to a logical "0" level. Flip-flop output $O_1$ causes control transistor 45 to "turn on", thereby energizing relay 19, which opens switch 20 to interrupt energization of magnet valve device 5. In the deenergized condition of magnet valve 5, inlet 13 of double check valve device 6 is cut off from the regulated pressure in line 15 and is connected to atmosphere via line 15a and the magnet valve exhaust passage.

Double check valve device 6, thus remains in the position shown, a brake control pressure is vented from control chamber 11 of relay valve device 3 via inlet 12, in accordance with the well-known operation of brake control valve device 1. Exhausting pressure from control chamber 11 causes relay valve device 3 to connect brake pressure from brake units 8 to atmosphere via line 10 and exhaust passage Ex. The release of brake pressure from brake units 8 results in movement of the brake apparatus to brake release position in effecting retraction of the brake shoes, to thereby effect operation of the slack adjuster mechanism in the event brake shoe wear has occurred.

Timing circuit 18 maintains a timing signal at output terminal 44 for a predetermined period of time sufficient to assure release movement of the brake unit to brake release position, such as for example 6 seconds. This predetermined period of time is established in accordance with the characteristics of comparator 42 and the time constant of the r-c network consisting of resistor 24 and capacitor 25.

Concurrent with the aforementioned setting of flip-flop 40 to its output $O_1$, output $O_2$ goes to a logical "0" level and accordingly "turns off" transistor 41, thereby initiating the charging of capacitor 27.

When the voltage at trigger input 32 and thus at the negative input of comparator 42 exceeds a predetermined threshold level due to the charging of capacitor 25 (33.3% of the regulated supply voltage at the positive input of comparator 42), the comparator output goes to a logical "0" level. Accordingly, the signal at the set input S of flip-flop 40 disappears, but being bistable, flip-flop 40 maintains the logical state of its outputs $O_1$ and $O_2$ at a logical "1" and a logical "0" level respectively, thus maintaining the timing signal at output terminal 44 of timing circuit 29.

When the voltage at threshold terminal 33 and thus at the positive input of comparator 43 exceeds a predetermined threshold level due to the charging of capacitor 27 (66.6% of the voltage effective at the negative input of comparator 43), the comparator output goes to a logical "1" level. Input R of flip-flop 40 is thus presented with a signal to reset the flip-flop and thereby reverse the logical level of its outputs $O_1$ and $O_2$. This terminates the timing signal at output terminal 44. Accordingly, transistor 45 is "turned off", deenergizing relay 19, whereby its switch 20 closes to connect power B+ to magnet valve device 5. In its energized state, magnet valve device 5 connects "snow brake" control pressure from pressure regulator 4 to inlet 13 of double check valve device 6 via lines 15 and 15a. With a brake release in effect, pressure is absent at inlet 12, as previously explained, so that the double check valve element is shifted leftward, thereby connecting "snow brake" control pressure to chamber 11 of relay valve device 3. The relay valve in turn operates to connect pressure from supply reservoir 7 to brake units 8 via supply line 9 and delivery line 10, in accordance with the "snow brake" control pressure to allow the "snow brake" to become effective.

Resetting of flip-flop 40 also causes output $O_2$ to go to a logical "1" level, thereby "turning on" transistor 41. When this occurs, both terminals of capacitor 27 are effectively connected to ground and the capacitor is accordingly discharged in preparation for another timing control cycle.

Having now described the invention, what we claim as new and desire to secure by Letters Patent, is:

1. A "snow brake" control system for a railway vehicle having brake apparatus to apply and release the vehicle brakes, said brake apparatus including a slack adjuster that is operative in response to movement of said brake apparatus from a brake application position to a brake release position, said "snow brake" control system comprising:
    (a) means for providing a first brake control pressure in accordance with the degree of brake desired during a normal brake application;
    (b) means for providing a second brake control pressure at a predetermined level to provide a "snow brake" application during release of said normal brake application;
    (c) relay valve means subject to said first and second brake control pressures for effecting operation of said brake apparatus;
    (d) valve means for connecting one or the other of said first and second brake control pressures to said relay valve means;
    (e) electro-pneumatic valve means for establishing or interrupting the communication of said second brake control pressure with said valve means; and
    (f) timing means operative in response to the release of said first brake control pressure for controlling said electro-pneumatic valve so as to interrupt said communication of said second brake control pressure with said valve means for a predetermined time period and thereby delay said "snow brake" application for a period of time sufficient to allow said brake apparatus to move from said brake application position to said brake release position.

2. A "snow brake" control system as recited in claim 1, wherein said valve means for connecting one or the other of said first and second brake control pressures to said relay valve means comprises a double check valve device.

3. A "snow brake" control system as recited in claim 2, further characterized in that said double check valve device connects the predominant one of said first and second brake control pressures to said relay valve device.

4. A "snow brake" control system as recited in claim 2, further comprising:
    (a) a source of electrical power;
    (b) a control wire via which said source of power is connected to said electro-pneumatic valve device to effect energization thereof, said electro-pneumatic valve device thereby establishing fluid pressure communication of said second control pressure with said double check valve means; and
    (c) a relay having a switch in said control wire, said relay being energized in accordance with said operation of said timing means to interrupt said energization of said electro-pneumatic valve device and thereby interrupt said fluid pressure communication of said second control pressure with said double check valve means.

5. A "snow brake" control system as recited in claim 4, further comprising selectively operable switch means in said control wire in series with said relay switch for controlling activation of said "snow brake" control system.

* * * * *